March 27, 1956   C. B. EATINGER   2,739,408
FISHING DEVICES
Filed March 23, 1951

INVENTOR
CLOYDE B. EATINGER
*Cloyde B. Eatinger*

United States Patent Office 2,739,408
Patented Mar. 27, 1956

2,739,408
FISHING DEVICES
Cloyde B. Eatinger, Fort Dodge, Iowa

Application March 23, 1951, Serial No. 217,277

1 Claim. (Cl. 43—43.14)

My invention pertains to fishing devices with releasably secured weights separably supported thereto.

An object of my invention is to provide a new and unique arrangement to weight fishing devices or fishing tackle such as swivels, leaders, or the like.

The main object of my invention is to provide a new and unique swivel with variable sized weights releasably secured thereto. One end of said swivel to operate at a different angle than the main body and the opposite end, when weighted as above described.

Another object of my invention is to provide a fishing device with a releasably secured separably supported means for suspending interchangeable weights on said device. Said weights to be of various sizes to control the depth said device is to operate in the water.

Many weights are on the market together with many fishing devices for installation between a line and lure, these are most generally of a fixed and stationary nature and considerable time and work is necessary to make changes for different depths and for use on the several lures the angler usually uses in fishing. My invention will accomplish the above more efficiently.

In carrying out my invention, I provide a fishing device having a main portion or body, with a swivel means in the ends thereof, said body having a slot in the superior portion to provide for one of the swivel means to be of an adjustable nature to provide for said means to operate at different angles while at the same time the body and the opposite swivel means will operate on a level, horizontal line. Said body above mentioned having holes in its lateral sides to receive a yoke, said yoke being of substantially a U shape with the ends thereof being bent and converging toward the center of the yoke to allow the yoke to be separably supported to the body in the said lateral holes, a spring of a resilient wire, coiled upon itself and one end of said spring being soldered to the said yoke, a weight with an eyelet connecting means installed therein, said weight being releasably secured to said spring through the eyelet connecting means of the weight. It being understood that the yoke above mentioned may be omitted and the resilient wire spring may be attached directly to a main portion or body of a fishing device.

For a better understanding of my invention, I refer to the drawing, wherein.

Figure 1:
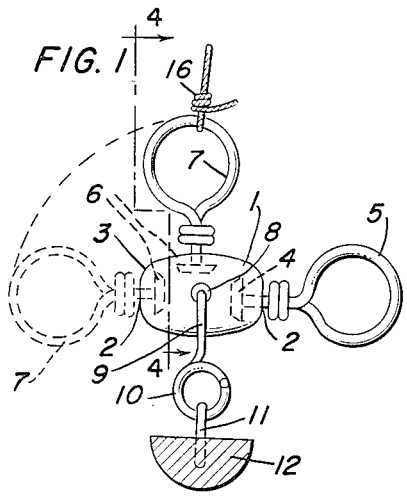
Figure 1 shows the side view of a fishing device in the form of a swivel, with the weight secured thereto.
Figure 2:
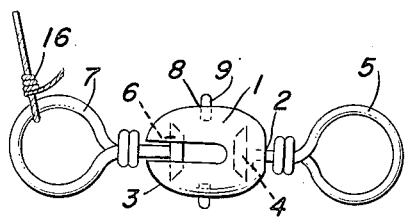
Figure 2 shows a top view of Figure 1.
Figure 4:
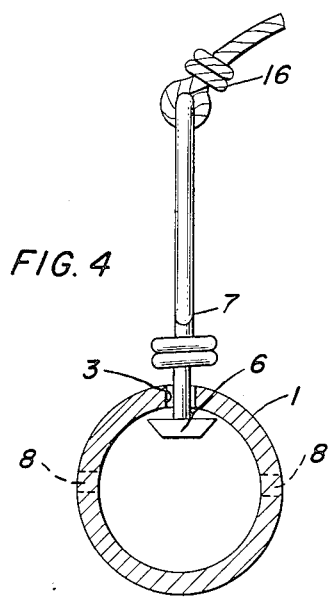
Fig. 4 is a sectional view taken substantially in the planes of the line 4—4 of Fig. 1 looking in the direction of the arrows.
Figure 3:
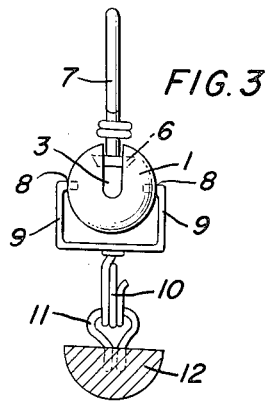
Figure 3 shows an end view of Figure 1.

In the numerals, like numerals represent like parts. A fishing device having a body 1, holes 2 in the ends thereof, a swivel means comprising a stud 4 and an eyelet 5 installed in one end of said body, eyelet 5 to engage a leader or the like, and a second swivel means comprising a stud 6 and an eyelet 7 installed in the opposite end of said body, eyelet 7 to engage a fishing line or the like, said means above mentioned installed in holes 2 of the body, a slot 3 in the superior portion of body 1 to permit the swivel means 6 and 7 to operate in a movable manner as shown by the dotted line to permit the said swivel means to operate at an angle while the body 1 and the swivel means 4 and 5 operate on a level, horizontal line, openings 8 in the lateral sides of body 1 to receive a yoke 9, the said yoke comprises resilient bail substantially of a U shape having legs thereon, said legs being provided with inturned end portions resiliently urged toward each other and pivotally supported in said openings, a spring 10 of a resilient wire coiled upon itself and one end thereof soldered to said yoke, the opposite end of the spring being free. An eyelet 11 forms a connecting means and is installed within a weight 12 to allow for the said weight to be releasably secured to spring 10 in a manner to permit said weight to dangle to impart movement to the body.

While I have shown certain specific embodiments of my invention for purposes of illustration, I reserve the right to make changes limited only by the scope of the appended claim.

Having fully described my invention, I claim:

A depth controlled fishing swivel comprising a body having line attaching means, leader attaching means, and means for detachably suspending a weight means therefrom, said body having a slot in the periphery and openings in opposite sides thereof, said weight suspending means comprising a yoke in the form of a resilient bail having the legs thereof straddling opposite sides of said body, said legs being provided with inturned end portions resiliently urged toward each other and pivotally supported in said openings, the bight portion of said bail lying below said body for swinging movement with respect thereto and having means for attachment thereto and detachment therefrom of said weight means; said leader attaching means comprising a first swivel eye mounted on one end of said body; and said line attaching means comprising a second swivel eye slidably retained in said slot and movable from a first position on said body at the end thereof opposite said one end and in alinement with said first swivel eye and extending in a direction opposite thereto, to a second position on said body at the top of said body extending in a direction opposite to and in substantial alinement with said weight attaching means, whereby the depth of said swivel in the water may be varied by the use of various weight means and said swivel may assume various positions with respect to said weight means, line, and leader.

References Cited in the file of this patent

UNITED STATES PATENTS

| 578,248 | Layne | Mar. 2, 1897 |
| 588,729 | Harris | Aug. 24, 1897 |
| 779,286 | Kramer | Jan. 3, 1905 |
| 1,033,464 | Pomeroy | July 23, 1912 |
| 1,264,627 | Foss | Apr. 30, 1918 |
| 1,744,419 | Soule | Jan. 21, 1930 |
| 2,022,602 | Mortensen | Nov. 26, 1935 |
| 2,139,294 | Weigant | Dec. 6, 1938 |
| 2,141,865 | Hermann | Dec. 27, 1938 |
| 2,223,922 | Schofield | Dec. 3, 1940 |
| 2,435,730 | Worden | Feb. 10, 1948 |

FOREIGN PATENTS

| 1,135 | Great Britain | Jan. 22, 1889 |